3,032,421
BINDING AGENTS FOR MEAT
Karl Buchholz, Mainz, Germany, assignor to Joh. A. Benckiser G.m.b.H., Ludwigshafen (Rhine), Germany, a German company
No Drawing. Filed May 18, 1955, Ser. No. 509,398
In Germany Oct. 1, 1948
Public Law 619, Aug. 23, 1954
Patent expires Aug. 23, 1974
8 Claims. (Cl. 99—109)

This invention relates to improvements in binding agents for meat.

In the manufacture of meat sausages it is generally necessary to add so-called binding agents to the meat since most meats do not possess the necessary binding power to insure a good cut of the sausage. Meat binding agents conventionally used for this purpose, included milk powder, casein, skin powder, potato powder and mixtures of this type. In order for these materials to produce the necessary binding effect, however, the same had to be added in relatively large amounts of, for example, 2–3% by weight of the meat. These materials would make up for the lack of binding power in the meat itself by substituting their own binding properties. The effectiveness of these known binding agents, however, would be materially reduced upon storage as, for example, in damp places, as is conventionally encountered in production plants. Furthermore, these substances, unless stored under the most optimum conditions will favor the growth of microorganisms which will render the product worthless.

One object of this invention is the production of meat sausages of the necessary binding power and without the above-mentioned disadvantages. This and still further objects will become apparent from the following description:

In accordance with the invention it has been discovered that meat as is used in the manufacture of meat sausages contains its own binding substances which may be activated by the addition of relatively small quantities of certain phosphates eliminating the need for the conventional binding agents.

In accordance with the invention, the binding power of the meat is activated by adding about 0.1–0.5% by weight and preferably about 0.3% by weight of a salt of an ortho-, meta-, pyro-, or polyphosphoric acid to the meat.

The meat which may be treated in accordance with the invention, may be any type of meat conventionally used in the production of sausages such as lean or fat beef or pork, etc., which, for example, may be treated with hot water during the sausage preparation.

Examples of phosphates which may be used include the sodium, potassium, ammonium, calcium, and urea salts of the phosphoric acids. In connection with the orthophosphoric acid salts, any of the sodium, potassium, ammonia, or urea salts may be used though the dibasic sodium ortho-phosphate which may be added alone is preferred. The sodium salt of the pyro-phosphoric acid and preferably tetra sodium pyrophosphate is preferred in connection with the pyro-phosphoric acid salts. In connection with the meta-phosphoric acids, the sodium and potassium salts of the hexa-meta phosphoric acid are preferred. In connection with the polyphosphoric acids, sodium tripolyphosphate is preferred due to its ease of production and stability and solubility. The above mentioned phosphoric acid salts may be used in mixtures with each other, and preferably in mixtures in which a phosphate which is poor in phosphoric acid is mixed with a salt rich in phosphoric acid. Thus, for example, mixtures of 70 parts of tetra sodium pyrophosphate with 30 parts of sodium tripolyphosphate; or 60 parts of tetra sodium pyrophosphate and 30 parts of sodium tripolyphosphate and 10 parts of sodium hexameta phosphate; or 40 parts of potassium meta phosphate, 40 parts of sodium tripolyphosphate and 20 parts of disodium pyrophosphate may be used. The above mixtures have pH values of 9.8; 9.2; and 8.8 respectively. Mixtures of the salt are of course not limited to the samples given above and many other mixtures may be used with satisfactory results.

In accordance with the invention the phosphoric acid salts are added together with alkali carbonates or bicarbonates such as sodium carbonate or sodium bicarbonate. The alkali carbonate is added in an amount sufficient to convert the acid phosphate in accordance with the following typical equation:

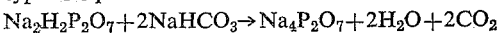

$Na_2H_2P_2O_7 + 2NaHCO_3 \rightarrow Na_4P_2O_7 + 2H_2O + 2CO_2$

In cases where a reaction product is desired which is less alkaline smaller amounts of the bicarbonates may be added. The alkali bicarbonates are preferred to the alkali carbonates since the former react more readily in the meat.

All the materials mentioned above may be used in combination with the salts of the known edible acids, such as citric acid, tartaric acid, lactic acid, adipic acid, etc., according to the ultimate use for which they are intended.

These edible acids produce a softer effect and a better taste in the meat. A mixture of one part of a phosphate and one part of a salt of an edible acid, as, for example, 1 part of sodium tripolyphosphate and 1 part of trisodiumcitrate has been found advantageous.

The phosphates, in accordance with the invention, when added in the small amount specified are sufficient to bring about the necessary binding power of the meat. This amount is about one-tenth of the amount of the conventional binding agents previously required. Furthermore, no additional organic binding agents such as glue or lime are introduced into the sausage and the binding is achieved in an extremely pure and natural manner. The additives produced in this way may be stored for an unlimited time without any decrease in their binding effect and have no deleterious effects upon the storage characteristics of the meat itself.

The sausages produced in accordance with the invention retain their natural meat flavor and have no undesirable or artificial taste.

In accordance with an embodiment of the invention, in order to prevent the addition of higher proportions of these additives to the meat than is required, the phosphoric acid salts may be admixed in the proper proportions to the spices or other commercial additives conventionally used in the sausage production. The phosphoric acid salts may be marketed in this mixture so that when the proper amounts of the spices or the like are added to the meat in the sausage production, the correct amount of the phosphoric acid salts will also be added.

The spices most commonly used include pepper, nutmeg, ginger, cardamone, pimento, etc. For example, in the production of frankfurters, a good mixture is 60 parts by weight of pepper and 20 parts by weights of ginger and 20 parts by weight of cardamone. 60 parts by weight of this spice mixture are mixed with 40 parts of the phosphate or phosphate mixture in accordance with the invention. 12 ounces of this phosphate spice mixture are added to each 100 lbs. of meat. A good spice mixture in the production of Wiener sausages consists of 80 parts by weight of pepper, 20 parts by weight of mace. 50 parts of this spice mixture are mixed with 50 parts of the phosphate or phosphate mixture in accordance with the invention. 10 ounces of this phosphate spice mixture are added to each 100 lbs. of the meat.

It is also possible in the manufacture of a special type of sausages to market the phosphoric acid salts in mixture with vitamins in which the meat to which the same is to be added is lacking, or, with additional vitamins, meat extractive substances, etc., thus making it possible to prepare sausages with an increased vitamin content.

In order to form sausages in accordance with the invention, the meat to be worked up into the sausage may be cut or ground into coarse pieces and mixed with salt or corning salt and the phosphate or phosphate mixture in accordance with the invention, stored for several hours in a cool place and further ground, spiced and filled into tins or skins in the conventional manner.

Alternately the coarsely cut or ground meat may be mixed with salt or corning salt, then stored for several hours in a cold place. The meat may then be further ground up and during this grinding may be mixed with the phosphate mixture in accordance with the invention, spiced and filled into skins or tins in the conventional manner. If, during the final grinding chips of ice or cold water are added the addition of the phosphate mixture in accordance with the invention, may be effected after the final grinding though it is preferable to effect the addition prior to this grinding or during the same.

The following examples are given by way of illustration and not limitation:

*Example 1*

In order to produce a cooking sausage of pure pork, 3 kg. of lean, cut-out pork shoulder meat and 2 kg. of pork lard are used. The pork is first coarsely ground and salted in the conventional manner and stored over night in a refrigerating chamber. The next day, the meat is seasoned and finely minced lard added. The mixture is then further ground with a good mixing being effected in the grinder. Just prior to finishing the grinding operation, 25 grams of a mixture consisting of 80% tetra sodium pyrophosphate and 20% sodium hexameta phosphate are added to the meat.

The cooking sausage mass thus obtained, swells and is smooth and soft and may easily be filled into skins in the conventional manner. After smoking and cooking the so-treated sausage remains tight in the skin for a considerably longer period than conventional sausages and are crisp on being bitten into and aromatic in taste.

*Example 2*

60 parts of tetra sodium pyrophosphate, 30 parts of sodium tripolyphosphate and 10 parts of calcinated disodium ortho-phosphate, are added to ordinary liver sausage in amount of 0.4% by weight. The liver sausage consists of pork liver, the intestines, bowel fat, tallow, lard, greaves, salt, and spices. After cooking the thus-treated sausage mass forms an excellent sausage which will not crumble and spreads better and is of a more homogeneous constitution than the conventional liver sausage.

*Example 3*

Cut fat beef and pork are ground together in order to manufacture meat balls, and ordinary salt and conventional spices worked in. 2 grams of potassium metaphosphate, 1 gram of acid sodium phosphate and 2 grams of hexasodium tetrapolyphosphate are added with the salt and spices to each 1 kg. of the meat. The meat balls produced bind together very well and will not fall apart during cooking.

I claim:
1. In the process for the production of meat sausage, the improvement comprising adding about 0.1 to 0.5%/wt. of at least two salts selected from the group consisting of salts of ortho-, meta-, pyro-, and polyphosphoric acids to the meat together with a member selected from the group consisting of alkali carbonate and alkali bicarbonates whereby a more alkaline phosphate reaction product is formed in the meat.

2. In the process for the production of meat sausage, the improvement comprising adding about 0.1 to 0.5%/wt. of at least two salts selected from the group consisting of salts of ortho-, meta-, pyro-, and polyphosphoric acids to the meat together with an equivalent amount of an edible acid is added to the meat based upon the phosphoric acid addition.

3. A process as claimed in claim 2 in which said edible acid is selected from the group consisting of citric acid, tartaric acid, lactic acid and adipic acid.

4. A processed meat containing the reaction product of 0.1 to 0.5%/wt. of at least two salts selected from the group consitsing of salts of ortho-, pyro-, meta-, and polyphosphoric acids and an amount of a member selected from the group consisting of alkali carbonate and alkali bicarbonates sufficient to form said reaction product as a more alkaline phosphate.

5. A processed meat containing 0.1 to 0.5%/wt. of at least two salts selected from the group consisting of salts of ortho-, pyro-, meta-, and polyphosphoric acids and an equivalent amount of an edible acid.

6. A processed meat as claimed in claim 5 wherein said edible acid is selected from the group consisting of citric acid, tartaric acid, lactic acid and adipic acid.

7. A spice material for processed meat containing at least two salts selected from the group consisting of salts of ortho-, pyro-, meta-, and polyphosphoric acids and a like amount of a member selected from the group consisting of alkali carbonate and alkali bicarbonates.

8. A spice material for processed meat containing at least two salts selected from the group consisting of salts of ortho-, pyro-, meta-, and polyphosphoric acids and an equivalent amount of an edible acid.

References Cited in the file of this patent

UNITED STATES PATENTS

| | | |
|---|---|---|
| 2,513,094 | Hall | June 27, 1950 |
| 2,553,533 | Komarik et al. | May 15, 1951 |
| 2,596,067 | Brissey | May 6, 1952 |
| 2,852,392 | Huber et al. | Sept. 16, 1958 |

FOREIGN PATENTS

| | | |
|---|---|---|
| 696,617 | Great Britain | Sept. 2, 1953 |

OTHER REFERENCES

"The National Provisioner," July 31, 1954, page 26.
"The National Provisioner," August 21, 1954, pages 6 and 7.